US012579395B2

(12) United States Patent

Kennedy et al.

(10) Patent No.: US 12,579,395 B2
(45) Date of Patent: Mar. 17, 2026

(54) TOOL HAVING A DETECTABLE WIRELESS MARKER OR TAG

(71) Applicant: Dexter-Russell, Inc., Southbridge, MA (US)

(72) Inventors: Thomas J. Kennedy, West Brookfield, MA (US); Nils B. Dahl, Wilbraham, MA (US); Gary P. Goguen, Belchertown, MA (US)

(73) Assignee: Dexter-Russell, Inc., Southbridge, MA (US)

( * ) Notice: Subject to any disclaimer, the term of this patent is extended or adjusted under 35 U.S.C. 154(b) by 0 days.

(21) Appl. No.: 19/043,834

(22) Filed: Feb. 3, 2025

(65) Prior Publication Data

US 2025/0225356 A1     Jul. 10, 2025

Related U.S. Application Data

(63) Continuation-in-part of application No. 18/134,341, filed on Apr. 13, 2023, now abandoned, which is a
(Continued)

(51) Int. Cl.
G06K 19/00 (2006.01)
A22B 5/00 (2006.01)
(Continued)

(52) U.S. Cl.
CPC .......... G06K 19/005 (2013.01); A22B 5/0047 (2013.01); A22C 15/003 (2013.01);
(Continued)

(58) Field of Classification Search
CPC .... G06K 19/005; A22B 5/0047; A22C 15/003
(Continued)

(56) References Cited

U.S. PATENT DOCUMENTS 6,452,497 B1    9/2002  Finlayson
8,876,009 B2   11/2014  Skoine et al.
(Continued)

FOREIGN PATENT DOCUMENTS

DE           9300173 U1    3/1993
DE      102008026716 A1   12/2009
(Continued)

OTHER PUBLICATIONS

United States Patent and Trademark Office (ISA) International Search Report and Written Opinion for PCT/US2024/015903 dated Jun. 10, 2024, pp. 11.
(Continued)

*Primary Examiner* — Allyson N Trail
(74) *Attorney, Agent, or Firm* — Bulkley, Richardson and Gelinas, LLP; Mary R. Bonzagni, Esq.

(57) ABSTRACT

A tool having a detectable wireless marker or tag is provided. The tool has a working portion with a projection or tang by which the working portion of the tool is held, a wireless tag located near the tang, and a handle disposed over and encompassing the tang and the tag. In one embodiment, an article is formed onto the tang. The article includes a side opening in the form of a downwardly sloped slot sized to securely anchor and partially encompass the tag, which extends above and beyond the tang contained within the article. The invention allows for the use of fragile tags, which are protected by the inventive article from temperatures and pressures used during, for example, tool handle manufacturing processes. Also provided is a method for providing a tool with a detectable wireless tag, and a method for tracking and tracing tools used within a packaging facility.

30 Claims, 11 Drawing Sheets

Related U.S. Application Data continuation-in-part of application No. 17/391,677, filed on Aug. 2, 2021, now Pat. No. 11,667,044.

(51) Int. Cl.

| | |
|---|---|
| *A22C 15/00* | (2006.01) |
| *B26B 11/00* | (2006.01) |
| *G06K 19/07* | (2006.01) |
| *G06K 19/077* | (2006.01) |

(52) U.S. Cl.
  CPC ........ *B26B 11/008* (2013.01); *G06K 19/0723* (2013.01); *G06K 19/07758* (2013.01)

(58) Field of Classification Search
  USPC ........................................................ 235/486
  See application file for complete search history.

(56)     References Cited

U.S. PATENT DOCUMENTS

| | | | | |
|---|---|---|---|---|
| 9,339,042 | B2 * | 5/2016 | Heston | H04W 4/80 |
| 10,335,965 | B2 | 7/2019 | Loehnert | |
| 12,376,595 | B1 * | 8/2025 | Julian | A22C 15/005 |
| 2004/0220602 | A1 | 11/2004 | Deng et al. | |
| 2006/0049949 | A1 * | 3/2006 | Jurs | A22B 7/002 |
| | | | | 235/492 |

| | | | | |
|---|---|---|---|---|
| 2007/0009097 | A1 | 1/2007 | Badger et al. | |
| 2007/0251063 | A1 | 11/2007 | Masahiro et al. | |
| 2010/0252626 | A1 | 10/2010 | Elizondo et al. | |
| 2011/0095893 | A1 | 4/2011 | Leyden et al. | |
| 2016/0221198 | A1 | 8/2016 | Loehnert | |
| 2018/0169844 | A1 | 6/2018 | Nemecek et al. | |
| 2020/0027458 | A1 | 1/2020 | Torok et al. | |
| 2020/0125915 | A1 * | 4/2020 | Forster | G06K 19/07786 |
| 2020/0333421 | A1 | 10/2020 | Perkins et al. | |
| 2020/0402653 | A1 * | 12/2020 | Koh | G16H 40/63 |
| 2021/0081856 | A1 * | 3/2021 | Michely | G06Q 50/12 |
| 2022/0197248 | A1 | 6/2022 | Weinberg | |
| 2023/0106441 | A1 * | 4/2023 | Stangler | B60C 11/246 |
| | | | | 324/261 |

FOREIGN PATENT DOCUMENTS

| | | | |
|---|---|---|---|
| EP | 2043826 | A1 | 4/2009 |
| EP | 2043826 | B1 | 2/2011 |
| EP | 2280609 | B1 | 8/2018 |
| IT | MI20060223 | A1 | 8/2007 |

OTHER PUBLICATIONS

United States Patent and Trademark Office (ISA) International Search Report and Written Opinion for PCT/US2021/050890 dated Jun. 14, 2022, pp. 11.

* cited by examiner

TOOL HAVING A DETECTABLE WIRELESS MARKER OR TAG

RELATED APPLICATION

This application is a continuation-in-part of U.S. patent application Ser. No. 18/134,341, filed Apr. 13, 2023, which is a continuation-in-part of U.S. patent application Ser. No. 17/391,677, filed Aug. 2, 2021, now U.S. Pat. No. 11,667, 044, which are all fully incorporated herein by reference.

TECHNICAL FIELD

The present invention relates generally to a tool having a detectable wireless marker or tag (e.g., a radio frequency identification (RFID) tag), and more particularly, in an exemplary embodiment, to a tool having a working portion with a projection or tang by which the working portion of the tool is held, an article formed onto the tang that partially encompasses the wireless tag, and a handle disposed over and encompassing the tang and the article and wireless tag.

BACKGROUND OF THE INVENTION

Cleanliness and sanitation are key in any meat, poultry, or fish packaging facility. Hand-held tools such as meat processing hooks and knives are used in such facilities, and due to the capability of such tools to transmit germs, users must adhere to a strict daily tool cleaning and disinfecting regimen. Routine cleaning and disinfecting of these tools ensures that meat, poultry and fish are not contaminated with harmful bacteria.

RFID tags in such hand-held tools are useful for the purpose of tracking and tracing these tools within these facilities to determine each tool's real-time location and to ensure that cleanliness and sanitation standards for each tool are being upheld. RFID tracking is also useful for determining the real-time condition of each tool and to use this information to manage the training/competency of the users, with a goal toward reducing repetitive motion injuries, which cost these facilities millions of dollars.

Typically, to apply RFID technology to a metal implement, a ceramic "on-metal" tag would be used. Such a tag is hardened against extremes of temperature and pressure and is designed to achieve optimal scan range when in contact with metal. The drawback of such a tag is expense. Standard processing tools such as knives wear out in only weeks, so added cost concerning such tools must be kept to an absolute minimum.

RFID tags in the form of miniature label-like device assemblies are inexpensive and thus more economically feasible. These label-like device assemblies, however, are also quite fragile and thus may be damaged by various adverse manufacturing and environmental conditions such as the high temperatures and pressures used during tool handle molding processes.

U.S. Pat. No. 10,335,965 to Loehnert (Friedr. Dick GmbH & Co., KG) relates to a knife having a knife blade with a tang and a label-like RFID transponder which is fixed to the tang. A knife handle surrounds the tang and the RFID transponder. The knife blade is produced from metal, in particular steel. The RFID transponder has an antenna and at least a portion of the antenna of the RFID transponder is constructed in a planar manner and is arranged parallel with a planar lateral face of the tang. The antenna of the RFID transponder may or may not be galvanically connected to the tang. In a first variant described in col. 2, lines 40-56, the antenna and tang are galvanically separated from each other, but there is electromagnetic (EM) coupling of the antenna to the tang. Good EM coupling is said to result from the parallel orientation and the small spacing (≤2 mm) between the antenna and the tang. The RFID transponder, however, is not protected from harm resulting from the heat and pressure using during the tool handle molding process.

It is therefore an object of the present invention to address this drawback by providing a means for protecting fragile tags from various adverse manufacturing and environmental conditions. More specific objects are to use an inexpensive detectable wireless tag that is structurally fragile as compared to ceramic tags, to hold the fragile tag in a desired location on a tool for optimal range and to maintain this desired location through a handle molding process (e.g., an injection molding process) and to protect the fragile tag from heat and pressure during such a handle molding process.

SUMMARY OF THE INVENTION

The present invention therefore provides a device that either fully or partially encompasses a detectable wireless tag, the device taking the form of either: an assembly that fully encompasses the tag ("housing assembly"); or an article that partially encompasses the tag ("article"), the device being suitable for use on a tool.

The term "detectable wireless tag", as used herein, includes, but is not limited to, RFID tags, ultra-wide-band location (UWB) tags, Wireless Fidelity (WiFi) location tags and infrared (IR) location tags.

The present invention further provides a tool having a detectable wireless tag, wherein the tool comprises: a working portion (e.g., a blade or a hook) with a projection or tang by which the working portion of the tool is held; a detectable wireless tag located near the tang; and a handle (e.g., in-line or T-Handle) disposed over and encompassing the projection or tang and the detectable wireless tag. The wireless tag, which has its own effective antenna, operates independently of the tang.

The term "tool", as used herein, relates to a device or implement, especially one held in the hand, used to carry out a particular function, and includes, but is not limited to, knives, meat cleavers, honing steels, meat or meat processing hooks (e.g., meat hooks, boning hooks), manual meat and bone saws and meat tenderizers.

The inventive housing assembly and the inventive article, both as described herein, serve to insulate the wireless tag from the tool's tang.

In one exemplary embodiment of the inventive housing assembly, the assembly comprises: an inner holder; an outer holder; and the detectable wireless tag positioned between the inner and outer holders, wherein:

(a) the tool is a meat or meat processing hook and the inner and outer holders of the inventive assembly are both substantially conical in overall shape and have a substantially circular cross-sectional shape. The inner holder, which is sized to nest within the outer holder, has a substantially flat section on its outer surface, which is sized to accommodate all or a portion of the detectable wireless tag; or (b) the tool is a knife and the inner and outer holders of the inventive assembly both have a flattened cylindrical overall shape and a substantially oval cross-sectional shape. The inner holder, which is sized to nest within the outer holder, has a substantially flat section on its outer surface, which is sized to accommodate all or a portion of the detectable wireless tag.

In another exemplary embodiment, the inventive housing assembly comprises: an enclosure with a side opening for receiving a detectable wireless tag; a cover that securely fits over the side opening; and a snap-fit assembly component integrally formed on an outer surface of the enclosure for receiving a tools' tang.

In one exemplary embodiment of the inventive article, the article is formed onto a projection or tang of a tool, the projection or tang holding a working portion of the tool, the article comprising a side opening in the form of a downwardly sloped slot that extends above and beyond the projection or tang contained within the article, the downwardly sloped slot being sized to securely anchor a detectable wireless tag.

The present invention further provides a method for providing a tool with a detectable wireless tag, which uses the inventive housing assembly, and which comprises:

(a) arranging for a detectable wireless tag to be housed within an assembly; and either (b)(1) arranging for the assembly housing the detectable wireless tag to be positioned on the projection or tang of the tool, and then arranging for either (i) a handle to be formed over and thereby encompass the assembly and the tang, or (ii) the tang with the assembly to be inserted into a hole in a pre-existing handle and then at least partially filling the hole to firmly hold in place the assembly and the tang; or (b)(2) arranging for a handle to be formed over and thereby encompass the assembly housing the detectable wireless tag and attaching the tang to the handle and assembly using known techniques (e.g. hafting technique).

The present invention also provides a method for providing a tool with a detectable wireless tag, which uses the inventive article, and which comprises:

forming the article on the projection or tang of the tool, wherein the article has a side-opening in the form of a downwardly sloped slot that extends above and beyond the projection or tang contained within the article, the downwardly sloped slot being sized to securely anchor the detectable wireless tag;

inserting the detectable wireless tag into the downwardly sloped slot of the article; and either forming a handle onto the article and the tang, the handle fully encompassing the article and the tang; or arranging for the article and the tang to be inserted into a hole in a pre-existing handle and then at least partially filling the hole to firmly hold in place the article and the tang.

Also provided by way of the present invention is a method for monitoring (tracking and tracing) tools used within a packaging facility (e.g., a meat, poultry or fish packaging facility), which method comprises: using one of the above-referenced housing assemblies or one of the inventive articles described herein with tools used within the packaging facility to track and trace each tool within the facility.

Other features and advantages of the invention will be apparent to one of ordinary skill from the following detailed description. Unless otherwise defined, all technical and scientific terms used herein have the same meaning as commonly understood by one of ordinary skill in the art to which this invention belongs.

All publications, patent applications, patents and other references mentioned herein are incorporated by reference in their entirety. In case of conflict, the present specification, including definitions, will control. In addition, the materials, methods, and examples are illustrative only and not intended to be limiting.

BRIEF DESCRIPTION OF THE DRAWINGS

The present disclosure may be better understood with reference to the following drawings. Matching reference numerals designate corresponding parts throughout the drawings, and components in the drawings are not necessarily to scale, emphasis instead being placed upon clearly illustrating the principles of the present disclosure.

While exemplary embodiments are disclosed in connection with the drawings, there is no intent to limit the present disclosure to the embodiment or embodiments disclosed herein. On the contrary, the intent is to cover all alternatives, modifications, and equivalents.

Figures 1A, 1B, 1C, 1D:
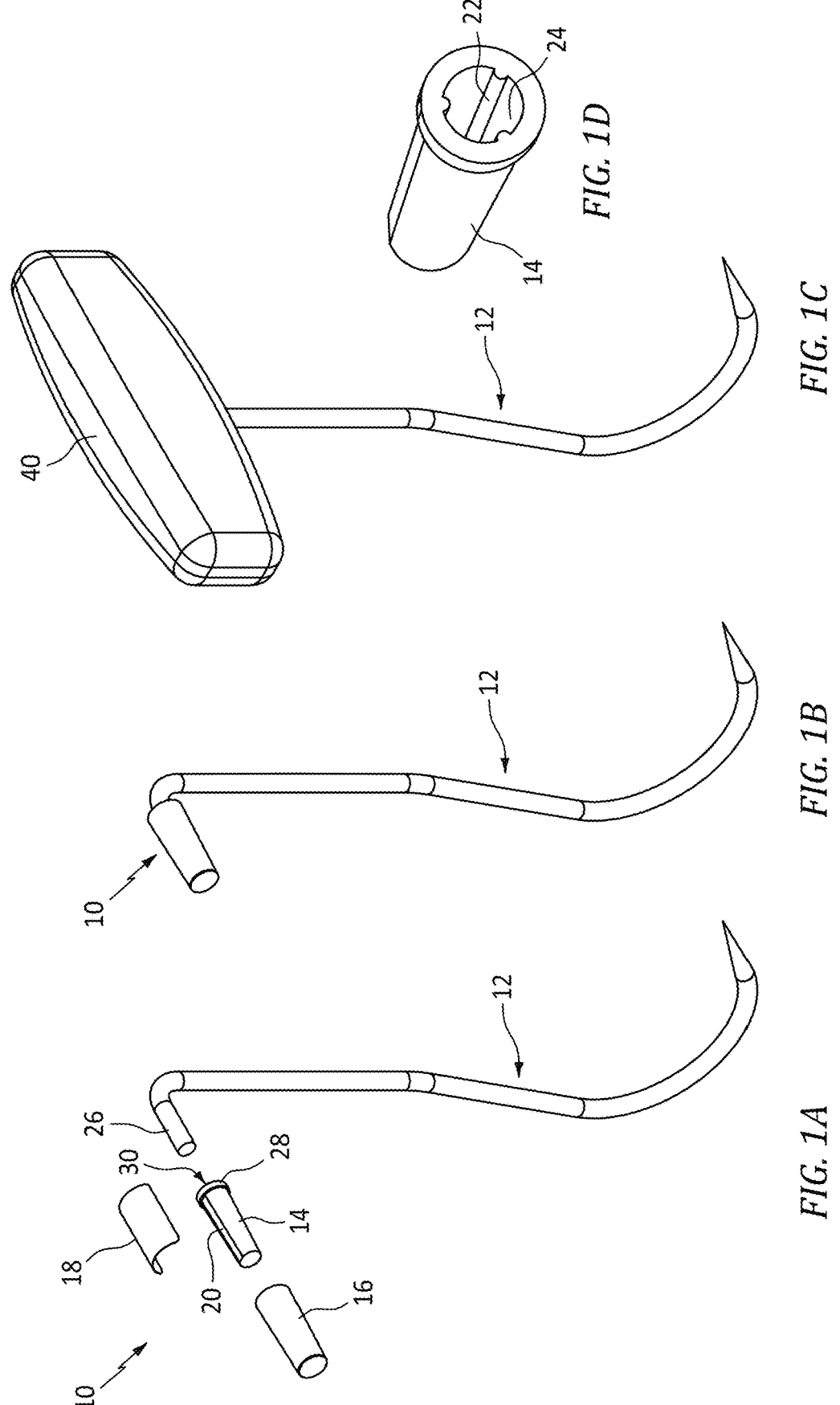
Figures 2A, 2B, 2C, 2D:
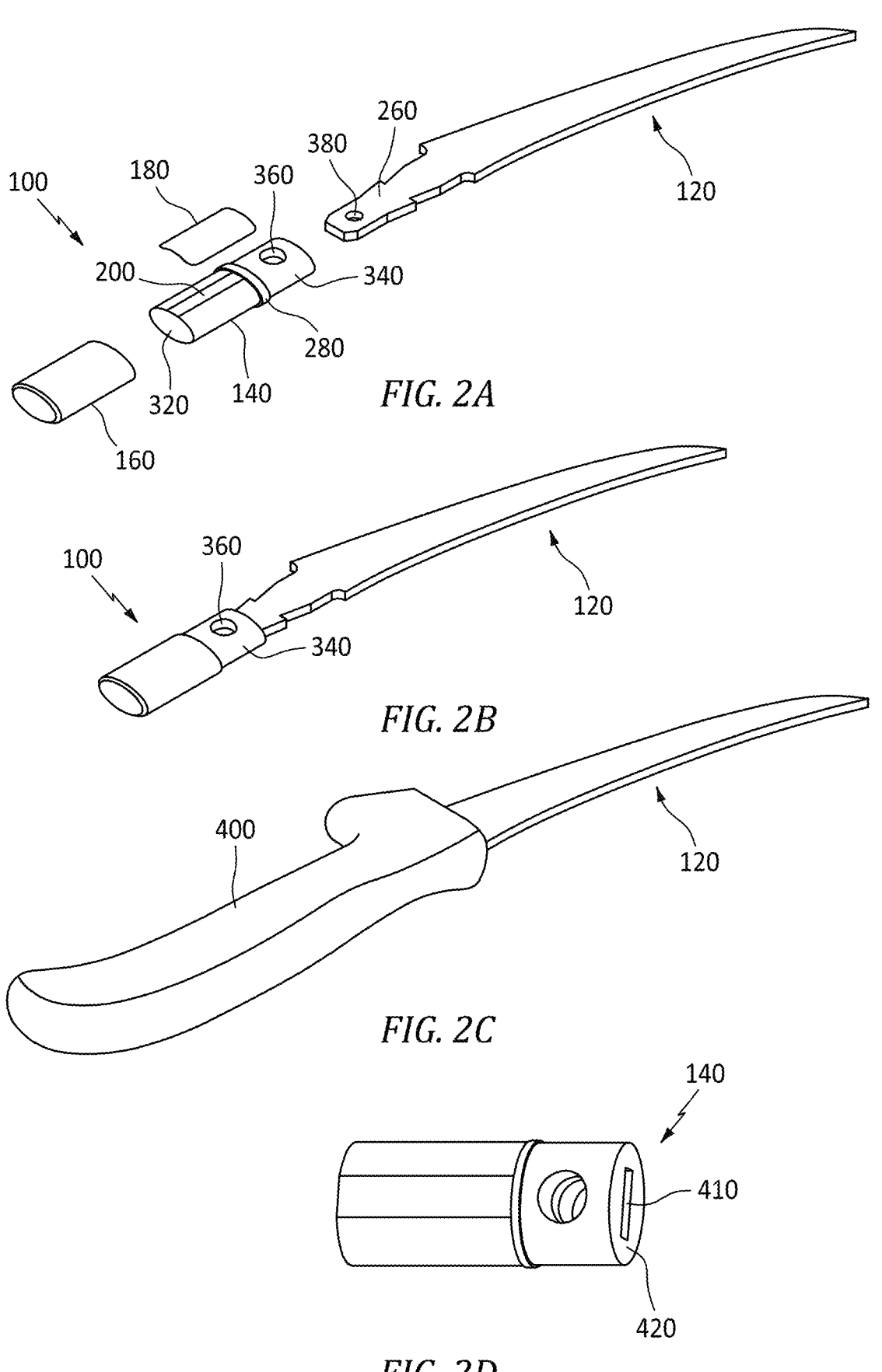

Particular features of the disclosed invention are illustrated by reference to the accompanying drawings in which:

FIG. 1A is a schematic exploded view of an exemplary embodiment of the inventive housing assembly with detectable wireless tag and a tool in the form of a metal hook before the inventive housing assembly is assembled onto the tang of the metal hook;

FIG. 1B is a schematic view of the inventive housing assembly shown in FIG. 1A upon assembly onto the tang of the metal hook;

FIG. 1C is a schematic view of an exemplary embodiment of the tool (metal hook) of the present invention, which is shown with a handle overmolded onto both the inventive housing assembly and the tang of the metal hook shown in FIG. 1B;

FIG. 1D is a schematic view of an exemplary embodiment of the inner holder of the housing assembly shown in FIG. 1A, which is shown with three ribs extending from an inner surface of the holder;

FIG. 2A is a schematic exploded view of another exemplary embodiment of the inventive housing assembly with detectable wireless tag and a tool in the form of a knife before the inventive housing assembly is assembled onto the tang of the knife;

FIG. 2B is a schematic view of the inventive housing assembly shown in FIG. 2A upon assembly onto the tang of the knife;

FIG. 2C is a schematic view of an exemplary embodiment of the tool (knife) of the present invention, which is shown with a handle overmolded onto both the inventive housing assembly and the tang of the knife shown in FIG. 2B; and FIG. 2D is a schematic view of an exemplary embodiment of the inner holder of the housing assembly shown in FIG. 2A, which is shown with a rectangle-shaped slot for receiving the tang.

Figures 3A, 3B:
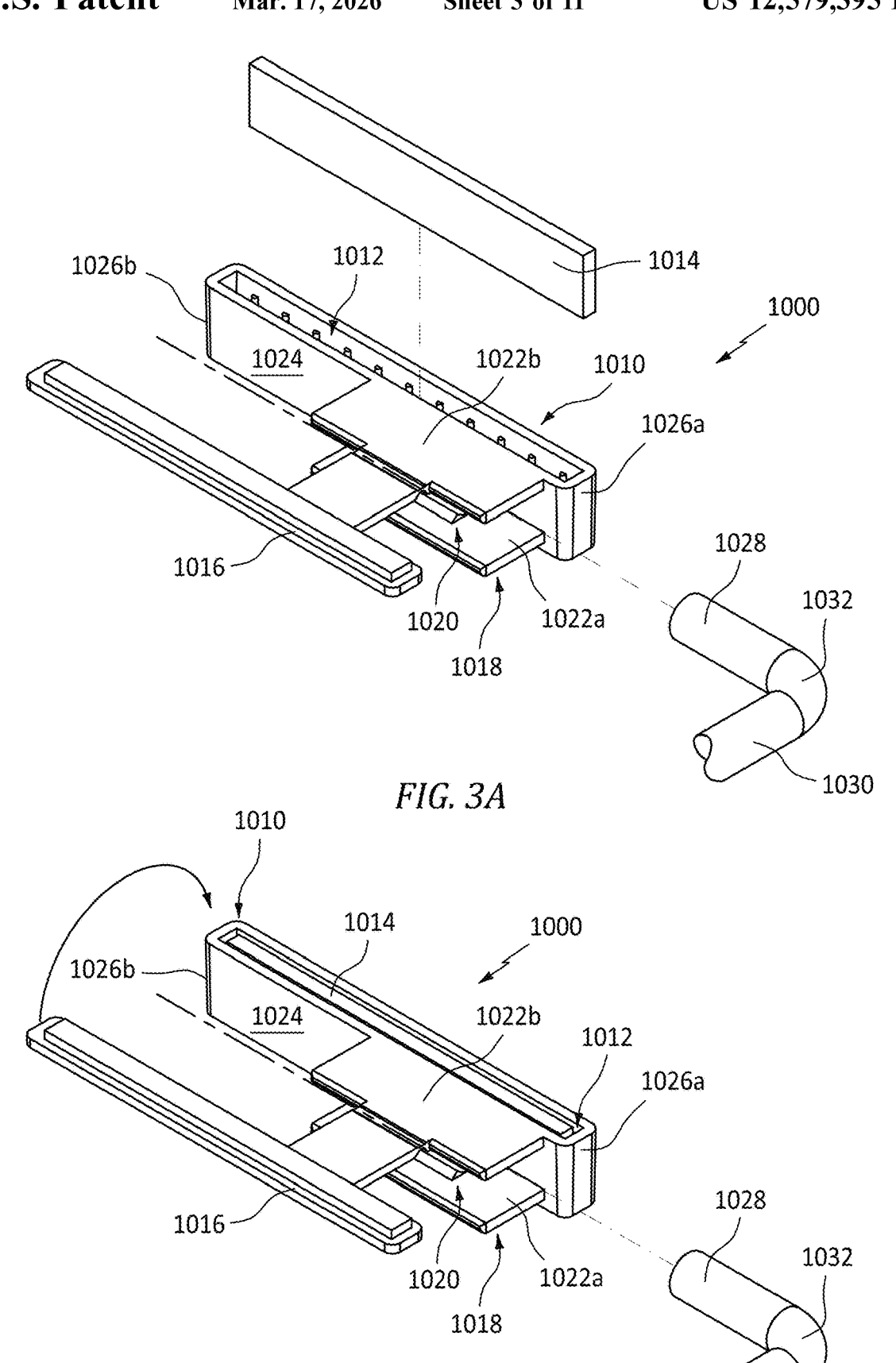
Figure 3C:
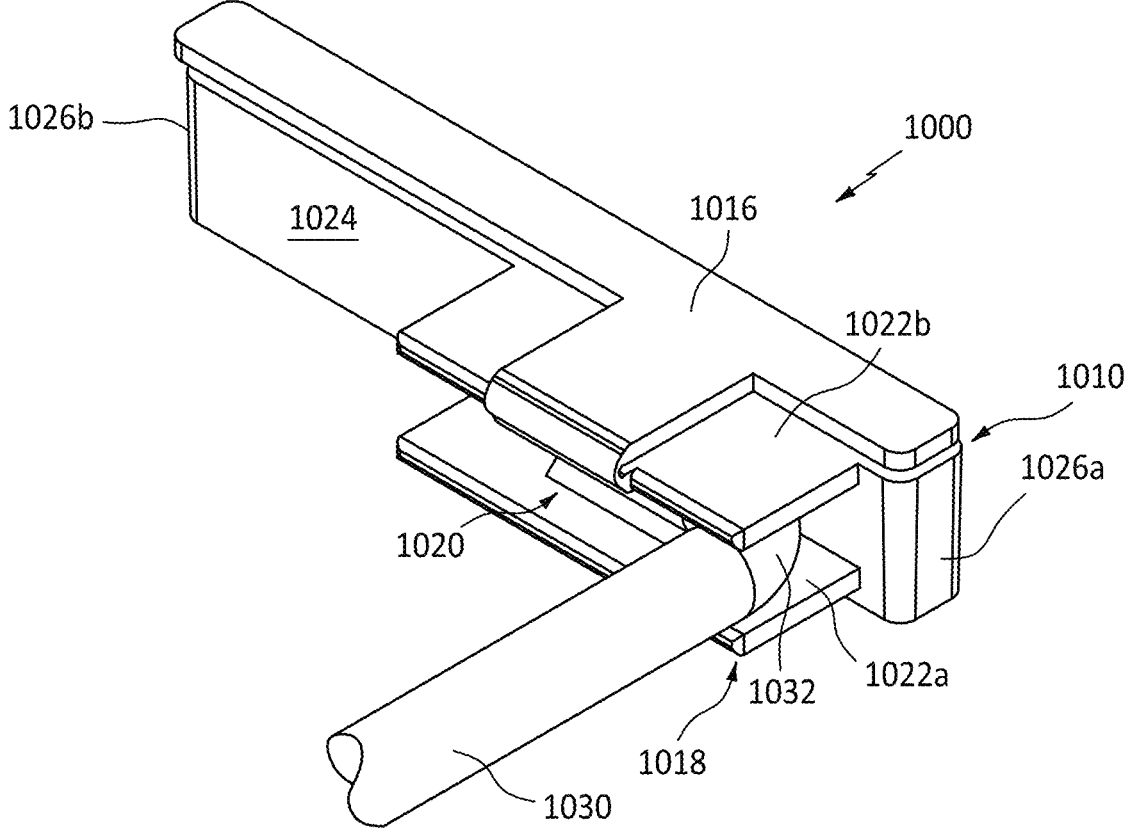
Figure 4:
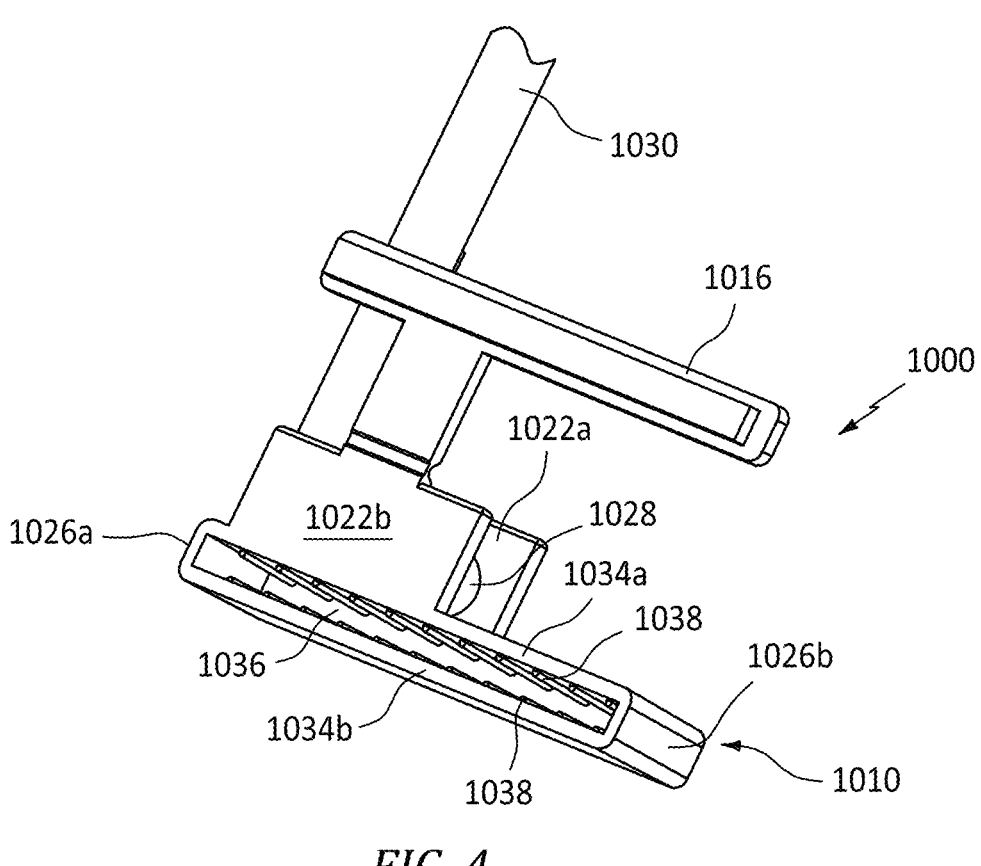
Figure 5:
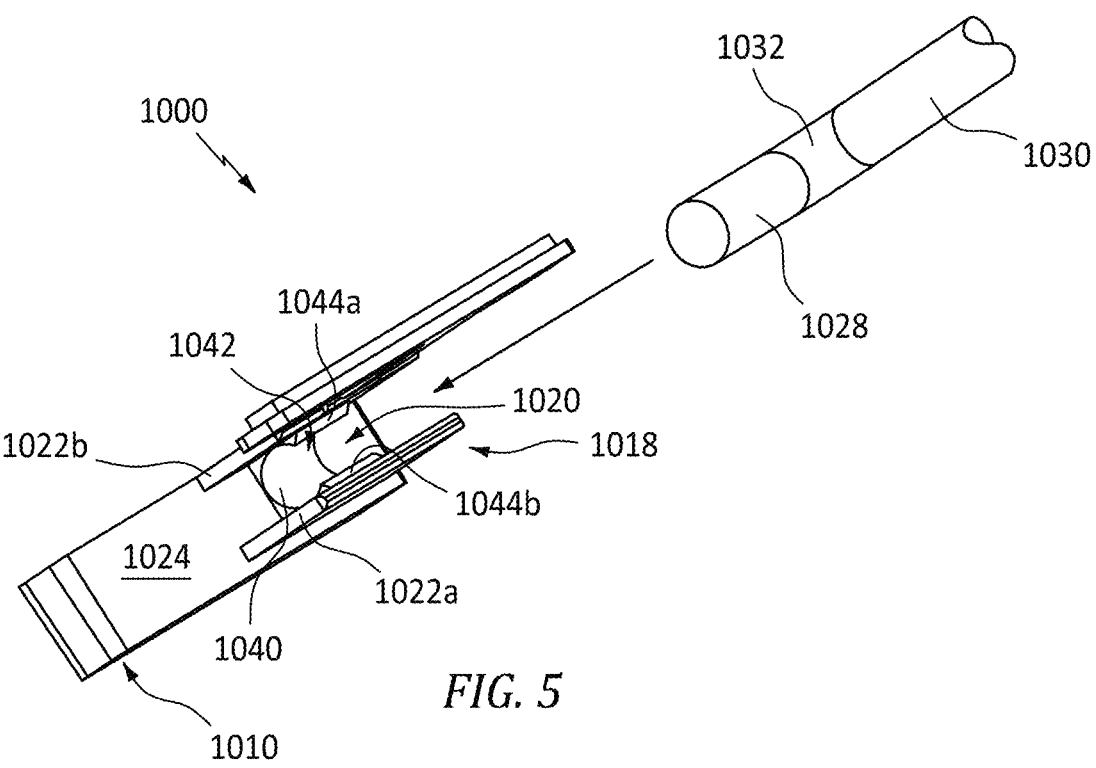
Figure 6:
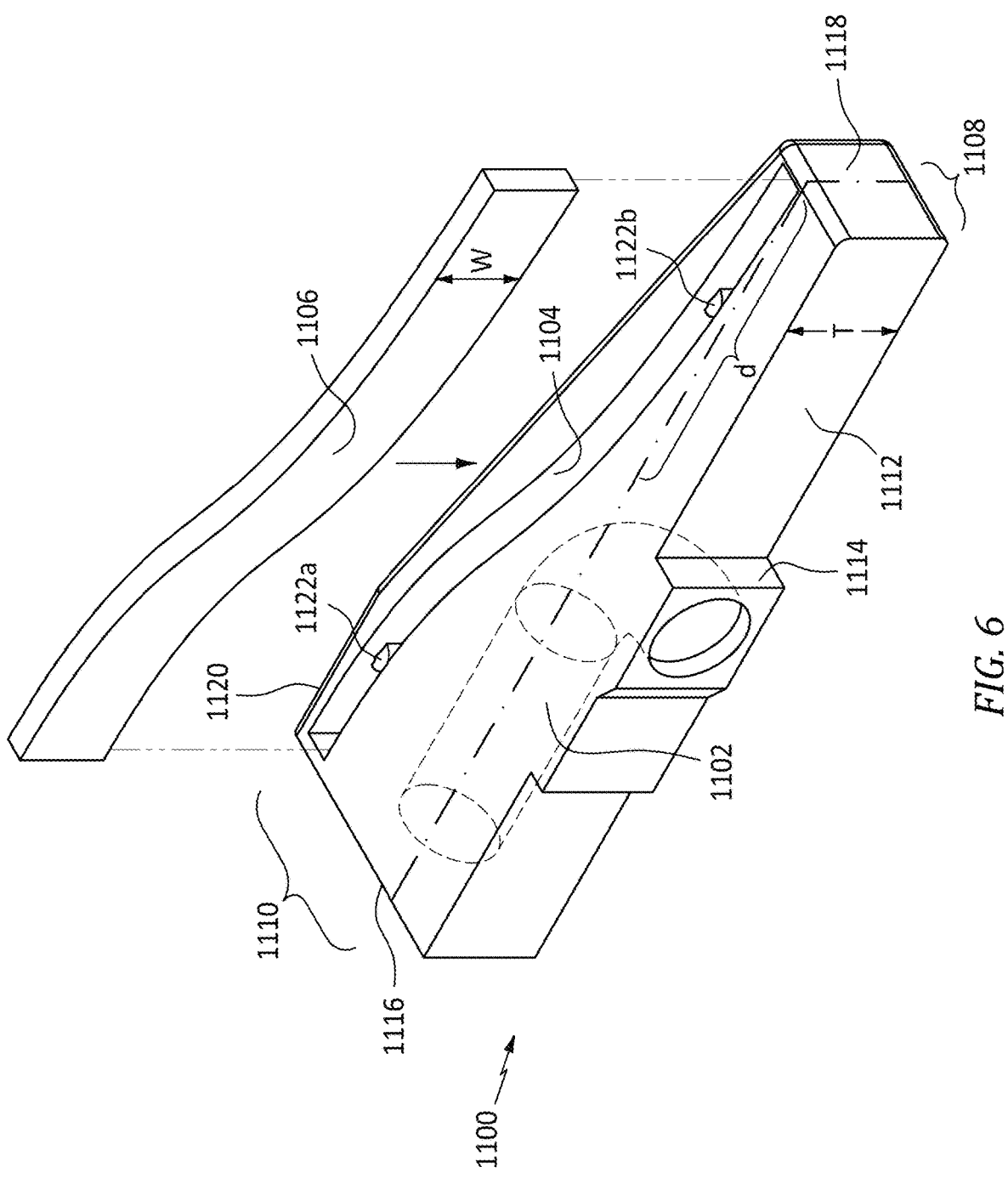
Figure 7:
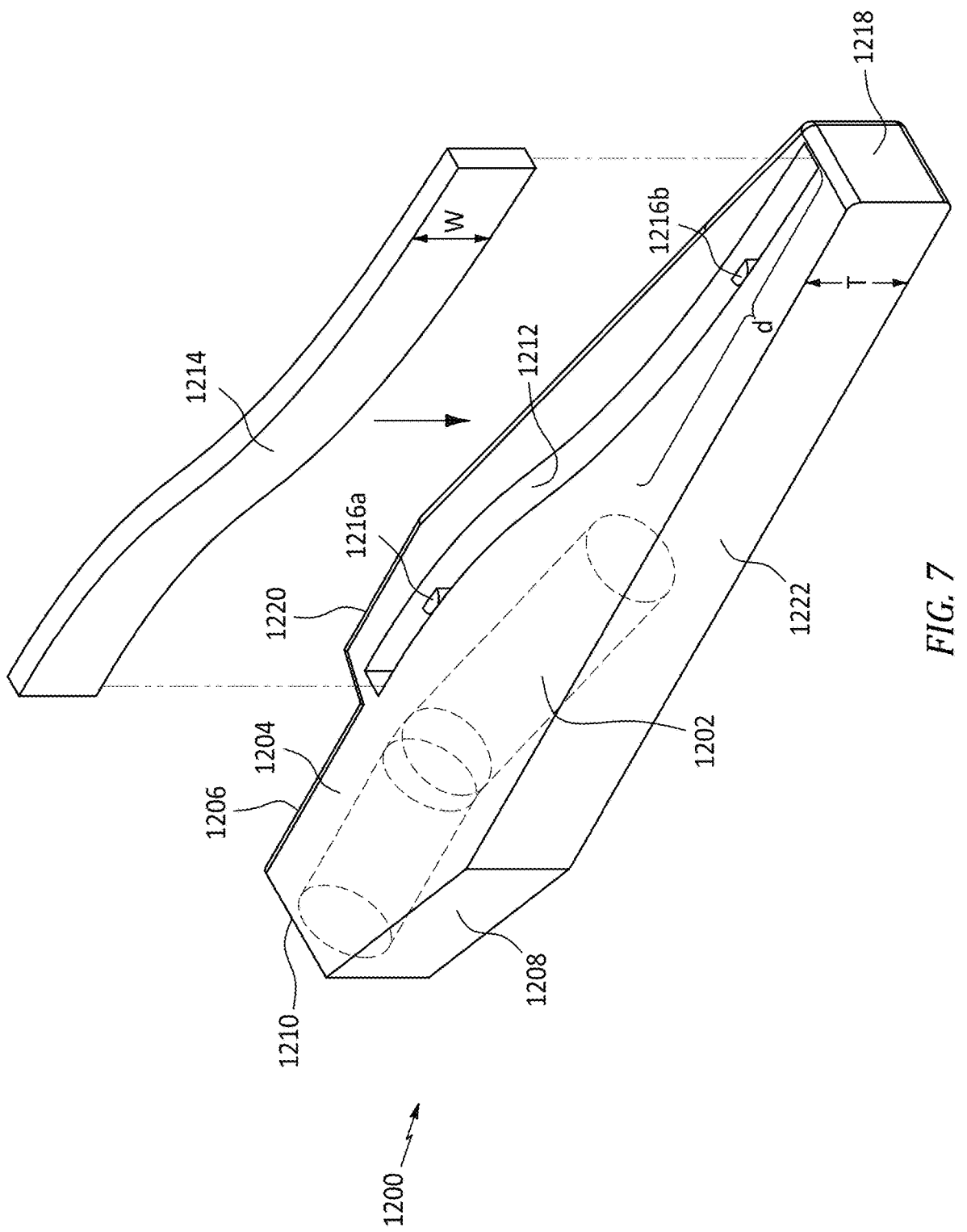
Figure 8:
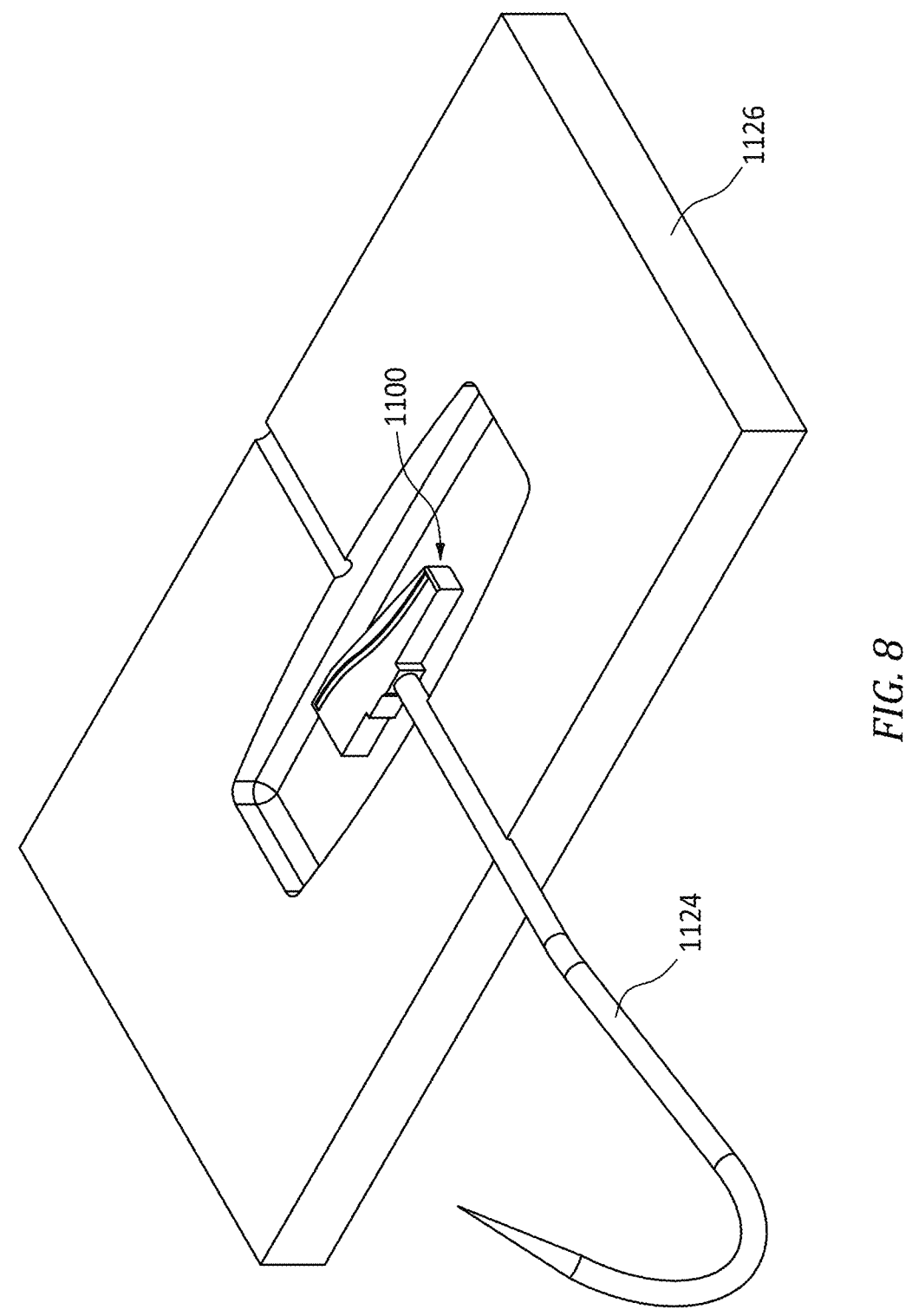
Figure 9:
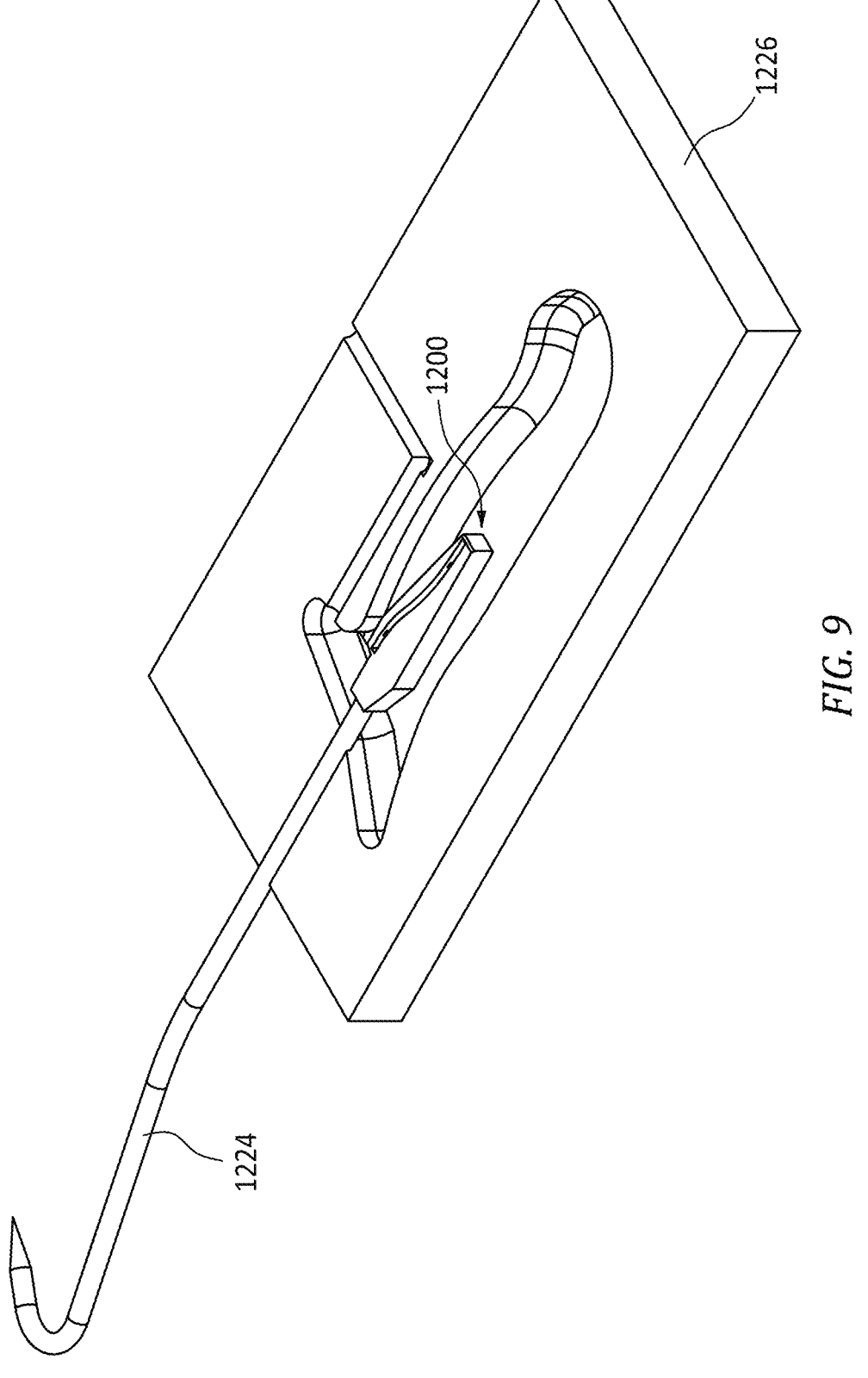
Figure 10:
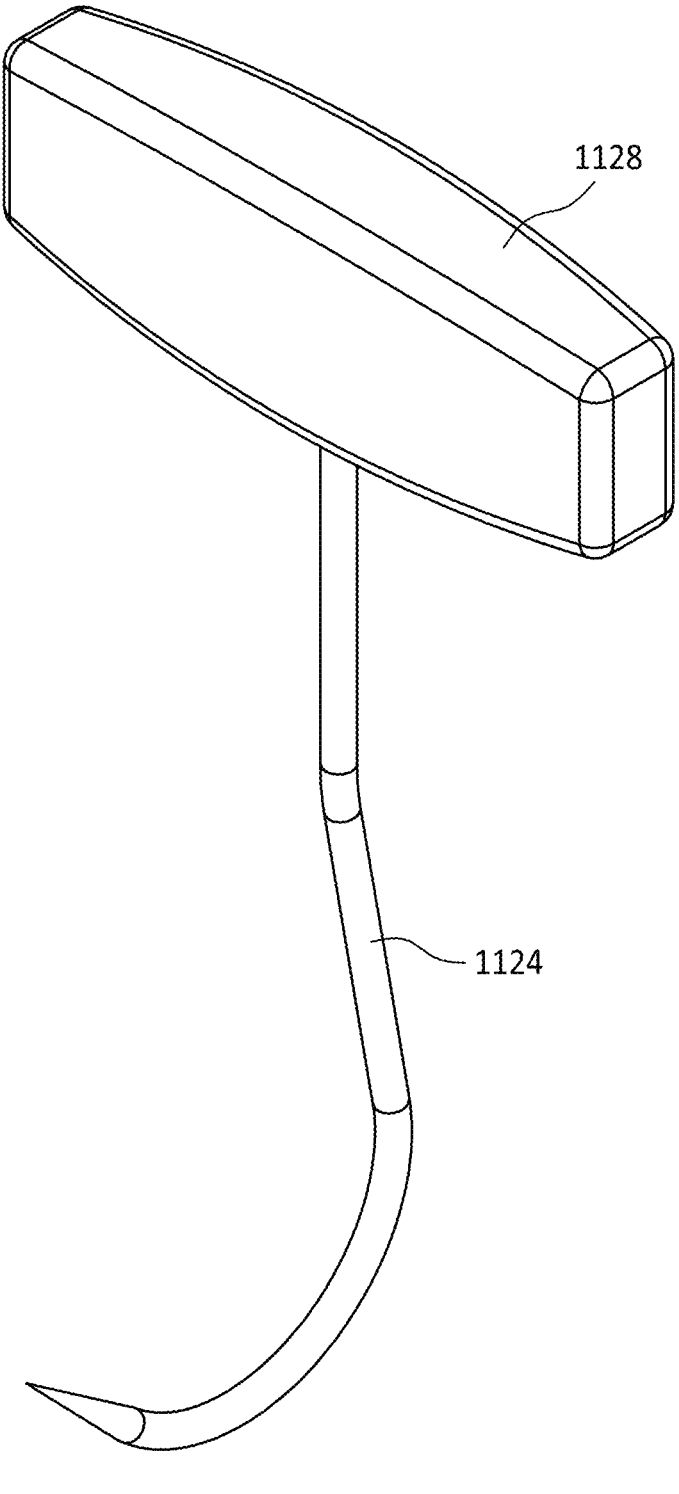
Figure 11:
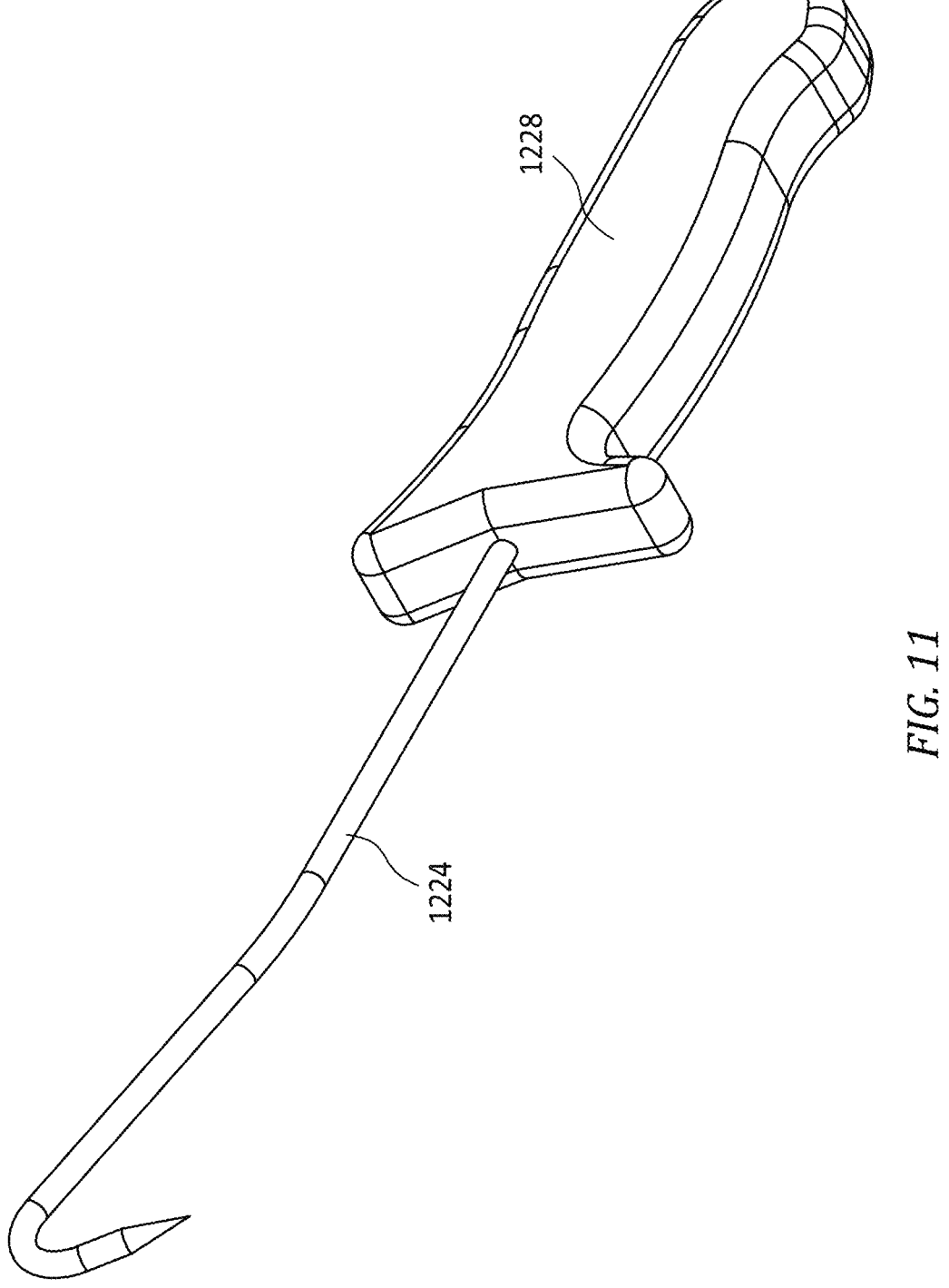

FIG. 3A is a schematic exploded view of yet another exemplary embodiment of the inventive assembly for use on a tool in the form of a meat or meat processing hook, before the detectable wireless tag is inserted into the inventive housing assembly and before the tang is inserted into the assembly;

FIG. 3B is a schematic view of the inventive housing assembly shown in FIG. 3A after the detectable wireless tag is inserted into the inventive housing assembly but before the cover is applied over the side opening of the substantially rectangular-shaped enclosure and before the tang is inserted into the assembly;

FIG. 3C is a schematic view of the inventive housing assembly shown in FIG. 3B after the cover is applied over the side opening of the substantially rectangular-shaped enclosure and after the tang is inserted into the assembly;

FIG. 4 is a schematic side view of the inventive housing assembly shown in FIG. 3A before the detectable wireless tag is inserted into the substantially rectangular-shaped enclosure of the housing assembly but after the tang is inserted into the assembly, where a series of spaced ribs are shown extending from oppositely facing longitudinal walls of the enclosure of the inventive housing assembly;

FIG. 5 is a schematic top view of the inventive housing assembly shown in FIG. 3B showing the snap-fit assembly component of the inventive housing assembly integrally formed on an outer surface of the enclosure for receiving a tools' tang;

FIG. 6 is an exploded, perspective view of an exemplary embodiment of the inventive article, which is suitable for use with a T-Handle, and a detectable wireless marker or tag, the inventive article shown formed over a tang of a meat hook;

FIG. 7 is an exploded, perspective view of another exemplary embodiment of the inventive article, which is suitable for use with an in-line handle, and a detectable wireless marker or tag, the inventive article formed over a tang of a boning hook;

FIG. 8 is a perspective view of the inventive article of FIG. 6, which is shown positioned on a lower half of a T-Handle mold;

FIG. 9 is a perspective view of the inventive article of FIG. 7, which is shown positioned on a lower half of an in-line handle mold;

FIG. 10 is a perspective view of a meat hook with a T-Handle housing the inventive article and tang shown in FIG. 6; and FIG. 11 is a perspective view of a boning hook with an in-line handle housing the inventive article and tang shown in FIG. 7.

DETAILED DESCRIPTION OF THE INVENTION

Although the present invention will be described herein-below mainly in association with tools in the form of meat or meat processing hooks and knives and further in association with detectable wireless tags in the form of RFID tags, the invention is not so limited. Tools have been described above as including, but not limited to, knives, meat cleavers, steels, meat or meat processing hooks (e.g., meat hooks, boning hooks), manual meat and bone saws and meat tenderizers, while detectable wireless tags have been described above as including, but not limited to, RFID tags, UWB tags, WiFi location tags and IR location tags.

As noted above, exemplary tools for use in the present invention include, but are not limited to, meat or meat processing hooks and knives. Each tool comprises a working portion with a projection or tang by which the working portion (e.g., a hook or a blade) of the tool is held. Such tools, which are typically made of metal (e.g., steel), are widely available from known manufacturers.
RFID System A typical RFID system includes two primary types of components, namely, a reader device and a tag.

The RFID tag is typically a very small label-like device assembly containing an integrated circuit ("IC") chip and an antenna mounted on a flexible plastic or paper substrate. The tag can respond, via a wireless air interface channel, to a Radio Frequency (RF) interrogation signal generated and transmitted by the reader device. The RFID tag is configured to generate a return reply signal in response to the RF interrogation signal emitted by the reader, the response signal being modulated in a manner to convey identification (e.g., a unique code or identifier for the tool) or other data stored within the tag or remotely in the cloud (e.g., on the Internet) back to the reader device. The term "cloud", as used herein, is meant to broadly encompass all remote data storage configurations.

The RFID tag used in the practice of the present invention is "passive", meaning that the tag has no battery and is excited and powered by the reader/antenna signal. This is different from an "active" tag, which contains a battery, and thus is self-powered.

The substrate serves to hold the tag components together. The tag antenna is deposited or printed on the substrate, and the IC chip is then attached to this antenna. The substrate, as noted above, is usually made from flexible material such as a flexible plastic or paper material, but it may also be made from a rigid material (e.g., a ceramic material). Most passive tags use substrates made from flexible material with a preferred thickness ranging from about 50 to about 200 micrometers (μm). Passive tags using substrates made from a rigid ceramic material have a preferred thickness ranging from about 2.0 to about 3.0 millimeters (mm).

The substrate material must be able to withstand various environmental conditions through which the tag may pass during its lifespan. Some of the materials used for the substrate include, but are not limited to, paper and polymers such as phenolics, polyamides (nylons), polyesters, polyethylene terephthalate (PET), polypropylene, polyvinyl chloride (PVC), and styrene. The substrate material must provide a smooth printing surface for antenna layout, mechanical protection for the antenna, chip, and their interconnections, dissipation of static buildup, and durability and stability under various operating conditions. Some of the environmental conditions that can affect the substrate are heat, moisture, vibration, chemicals, sunlight, abrasion, impact, and corrosion. One side of the substrate is usually coated with an adhesive material to attach the tag to an object. The adhesive material must be able to withstand appropriate environmental conditions.

RFID tags can be classified by the RF range they use to communicate (i.e., low, high, or ultra-high), and the way the tag communicates with the reader (active or passive).

In an exemplary embodiment, the "passive" RFID tag used in the practice of the present invention measures from about 20 to about 28 mm (preferably, from about 22 to about 26 mm) in total length, and from about 10.5 to about 20.5 mm (preferably, from about 13.5 to about 17.5 mm) in total width, and incorporates an IC chip and an antenna into a substrate, the substrate being selected from the group of single or multi-layer flexible plastic or paper substrates. In another exemplary embodiment, the "passive" RFID tag incorporates an IC chip and an antenna onto a substrate, the substrate being selected from the group of single-layer and multi-layer flexible plastic or paper substrates, enclosed by a soft rubber casing. The outer rubber casing measures from about 51 to about 59 mm (preferably, from about 53 to about 57 mm) in total length, from about 3 to about 11 mm (preferably, from about 5 to about 9 mm) in total width, and from about 1.0 to about 2.2 mm (preferably, from about 1.2 to about 2.0 mm) in total height. In yet another exemplary embodiment, the RFID tag is a "passive" RFID tag made using a hardened ceramic substrate.

In a preferred embodiment, the RFID tag is a passive Ultra-High Frequency (UHF) RFID tag (plastic substrate)

with an adhesive backing, which operates in the about 860 megahertz (MHz) to about 960 MHz range.

The RFID tag preferably has a wide omnidirectional read range, even when covered or embedded within both the inventive housing assembly and tool handle, of at least about 15 centimeters (cm), more preferably, from about 15 to about 200 cm. The RFID tag may be read by any suitable RFID reader.

The RFID tag of the present invention is located on, but insulated from, the tang using the inventive tag housing assembly, or is partially encompassed by the inventive article, which is formed on the tang, both as described in more detail below.

Device

The present invention provides a device that either fully or partially encompasses a detectable wireless tag (e.g., an RFID tag), the device taking the form of either: an assembly that fully encompasses the tag ("housing assembly"); or an article that partially encompasses the tag ("article"), the device being suitable for use on a tool.

Housing Assembly

The inventive housing assembly serves: to hold the tag in a desired position/location for optimal range through one or more manufacturing processes (e.g., a molding or overmolding process for producing a handle); and to protect the tag from harm resulting from its exposure to raised temperatures and pressures during the one or more manufacturing processes.

Referring now to the drawings in detail, reference numerals 10 and 100 have been used to denote a first and a second exemplary embodiment of the inventive housing assembly, respectively. Generally, the first and second exemplary embodiments comprise an inner holder; an outer holder; and the detectable wireless tag positioned between the inner and outer holders.

In the first exemplary embodiment 10, which is shown in FIG. 1A, the tool is a meat processing hook 12, and the housing assembly 10 comprises: an inner holder 14; an outer holder 16; and a detectable wireless tag 18 positioned between the inner and outer holders 14, 16. In this exemplary embodiment, both the inner holder 14 and the outer holder 16 are substantially conical in overall shape and have a substantially circular cross-sectional shape. The inner holder 14, which is sized to nest within the outer holder 16, has a substantially flat section 20 on its outer surface, which is sized to accommodate all or part of the tag electronics (i.e., IC chip) of the detectable wireless tag 18. When the outer holder 16 is positioned over the inner holder 14, the substantially flat section 20 of the inner holder 14 forms a gap which aides in protecting the tag electronics. The antenna portion of the tag 18 will typically extend beyond opposing longitudinal edges of the substantially flat section 20 of the inner holder 14.

As best shown in FIG. 1D, the inner holder 14 has a plurality of ribs (preferably from about 2 to about 4 ribs) 22, on its inner surface 24, which are designed to contact the projection or tang 26, of the tool. The ribs 22, allow for a secure fit between the inner holder and the tang of a tool regardless of minor variations in the size/diameter of the inner holder and/or the tang.

During assembly of the inventive housing assembly, all or part of the tag electronics are positioned over and adhered to the substantially flat section 20 of the inner holder 14. The substantially flat section 20 has the added benefit of serving as a visual aid for proper tag placement during assembly. The antenna portion of the tag 18 is then wrapped and adhered around the outer surface of the inner holder 14 on both sides of the substantially flat section 20. Hence, once applied onto tang 26 (as shown in FIG. 1B), the RFID tag 18 is positioned substantially equidistant from tang 26, wrapping around it in a circular fashion. The inventive housing assembly 10 maintains the detectable wireless tag 18 at a distance of at least about 0.5 mm (preferably, from about 1.0 to about 2.0 mm) from the tang 26 of the meat processing hook 12.

As will be readily appreciated by those skilled in the art, for less flexible tags (e.g., hardened ceramic tags) that cannot wrap around the inner holder in a circular fashion, the inner and outer holders would be adapted to accommodate the tag shape.

In the second exemplary embodiment 100, which is shown in FIG. 2A, the tool is a knife 120, and the housing assembly 100 comprises: an inner holder 140; an outer holder 160; and a detectable wireless tag 180 positioned between the inner and outer holders 140, 160. In this second exemplary embodiment, both the inner holder and the outer holder have a flattened cylindrical overall shape and a substantially oval cross-sectional shape. As shown in FIG. 2D, inner holder 140 has an inner rectangle-shaped slot 410 located at its proximal end 420 for securely receiving the tang.

Similar to the first exemplary embodiment, during assembly of the inventive housing assembly 100, all or part of the tag electronics are positioned over and adhered to the substantially flat section 200 of the inner holder 140. The antenna portion of the tag 180 is then wrapped and adhered around the outer surface of the inner holder 140 on both sides of the substantially flat section 200. Hence, once applied onto tang 260 (as shown in FIG. 2B), the RFID tag 180 is positioned substantially equidistant from tang 260. The inventive housing assembly 100 maintains the detectable wireless tag 180 at a distance of at least about 0.5 mm (preferably, from about 1.0 to about 2.0 mm) from the tang 260 of the knife 120.

Again, for less flexible tags (e.g., hardened ceramic tags) that cannot wrap around the inner holder, the inner and outer holders would be adapted to accommodate the tag shape.

In both the first and second exemplary embodiments, as shown in FIGS. 1A, 2A, the inner holder 14, 140, has a collar 28, 280, which allows the inner and outer holders to securely fit (e.g., snap-fit) together. In the first exemplary embodiment, collar 28 is located on proximal end 30, while in the second exemplary embodiment, collar 280 is located from about 24.13 to about 26.67 mm from distal end 320. When securely fit together, the outer holder 16, 160, and the inner holder 14, 140, have points of contact only around the collar region, and thus there is little or no contact between the detectable wireless tag 18, 180, and the outer holder 16, 160.

Inner holder 140 of the second exemplary embodiment, as shown in FIGS. 2A, 2B, has a section 340, which extends beyond the collar 280, and which contains a hole 360 that aligns with a hole 380 on tang 260. This allows molten plastic (during formation of handle 400, as described below) to flow in through the aligned holes, thereby strengthening coupling of the handle to the tang.

The inner holder 14, 140 and the outer holder 16, 160, of the first and second exemplary embodiments, are both made from high-temperature, RF translucent materials such as polyethylene terephthalate (PET), polypropylene (PP), polyoxymethylene (POM), polycarbonate (PC), acrylonitrile butadiene styrene (ABS), polyamide 66P (A66), and ethylene propylene diene monomer (EPDM). The inner and outer holders may be 3D printed for low volume demands and injection molded for higher volume demands.

In the first exemplary embodiment, the inner and outer holders, 14, 16, both have a thickness ranging from about 0.74 to about 2.10 mm (preferably from about 0.77 to about 2.08 mm). The inner holder 14 has a length ranging from about 26.62 to about 26.72 mm, preferably, from about 26.62 to about 26.67 mm, an inner diameter ranging from about 4.90 to about 5.64 mm, preferably, from about 4.95 to about 5.59 mm, and an outer diameter ranging from about 6.86 to about 9.83 mm, preferably, from about 6.86 to about 9.78 mm. As will be readily appreciated by those skilled in the art, a draft angle applied to each holder will make the diameters different at the proximal and distal ends of the holder. The outer holder 16 has a length ranging from about 27.89 to about 27.99 mm, preferably, from about 27.94 to about 27.99 mm, an inner diameter ranging from about 7.77 to about 9.73 mm, preferably, from about 7.77 to about 9.68 mm, and an outer diameter ranging from about 9.35 to about 11.23 mm, preferably, from about 9.40 to about 11.18 mm.

In the second exemplary embodiment, the inner and outer holders 140, 160, both have a thickness ranging from about 0.75 to about 2.58 mm (preferably from about 0.78 to about 2.54 mm).

The inner holder 140 has a length ranging from about 43.13 to about 43.23 mm, preferably, from about 43.13 to about 43.18 mm, an inner semi-minor diameter ranging from about 7.57 to about 8.18 mm, preferably, from about 7.62 to about 8.13 mm, an inner semi-major diameter ranging from about 14.96 to about 15.80 mm, preferably, from about 15.24 to about 15.75, an outer semi-minor diameter ranging from about 7.57 to about 8.18 mm, preferably, from about 7.62 to about 8.13 mm, and an outer semi-major diameter ranging from about 15.19 to about 15.80 mm, preferably, from about 15.24 to about 15.75 mm. The rectangle-shaped slot positioned inside the inner holder 140 for securely receiving the tang, has a width ranging from about 2.49 to about 2.60 mm, preferably, from about 2.49 to about 2.54 mm, and a length ranging from about 10.11 to about 10.21 mm, preferably, from about 10.11 to about 10.16 mm.

The outer holder 160 has a length ranging from about 27.38 to about 27.48 mm, preferably, from about 27.42 to about 27.48 mm, an inner semi-minor diameter ranging from about 8.08 to about 8.18 mm, preferably, from about 8.08 to about 8.13 mm, an inner semi-major diameter ranging from about 15.70 to about 15.80 mm, preferably, from about 15.70 to about 15.75 mm, an outer semi-minor diameter ranging from about 9.09 to about 9.20 mm, preferably, from about 9.14 to about 9.20 mm, and an outer semi-major diameter ranging from about 16.71 to about 16.82 mm, preferably, from about 16.76 to about 16.82 mm.

When assembled onto the tang of a tool, the antenna of the wireless tag and the tang are galvanically separated and are not electromagnetically coupled. In other words, the subject invention does not provide for the electromagnetic coupling of the antenna of the wireless tag to the tang.

A third exemplary embodiment of the inventive housing assembly comprises: an enclosure with a side opening for receiving a detectable wireless tag; a cover that securely fits over the side opening; and a snap-fit assembly component integrally formed on an outer surface of the enclosure for receiving a tools' tang.

Referring now to FIGS. 3-5, reference numeral 1000 has been used to denote a preferred representation of the third exemplary embodiment. As best shown in FIGS. 3A, 3B, 3C, the preferred representation of housing assembly 1000 comprises: a substantially rectangular-shaped enclosure 1010 with a side opening 1012 extending therethrough, which is capable of containing detectable wireless tag 1014; a cover 1016 that securely fits over the side opening 1012; and a snap-fit assembly component 1018 made up of clamping means 1020 disposed between two opposing side walls 1022a, 1022b, said assembly integrally formed on an outer surface 1024 of the substantially rectangular-shaped enclosure 1010, offset from one end wall 1026a, wherein the clamping means 1020 is matched with the tool's tang 1028 for a snap-fit assembly.

In this preferred representation, the tool is a meat or meat processing hook, which is composed of the tang 1028, which is attached at a substantially perpendicular angle to the main body 1030 of the meat hook by way of an elbow bend or fitting 1032.

As best shown in FIG. 4, the substantially rectangular-shaped enclosure 1010 includes oppositely facing longitudinal walls 1034a, 1034b, a pair of oppositely facing end walls 1026a, 1026b, and a side wall 1036 opposite the side opening 1012, the end and side walls extending between the oppositely facing longitudinal walls.

In the exemplary embodiment shown in FIG. 4, the oppositely facing longitudinal walls 1034a, 1034b, of the substantially rectangular-shaped enclosure 1010 have a plurality of spaced ribs 1038 extending from an inner surface thereof. Upon placement within the enclosure, the detectable wireless tag 1014 rests upon the spaced ribs 1038, which serve to trap air and thus serve as an insulator. In another exemplary embodiment (not shown), instead of (or in addition to) ribs, the oppositely facing longitudinal walls 1034a, 1034b, have a series of voids or honeycombs, which likewise serve to trap air and thus serve as an insulator.

The secure fit of the cover 1016 of the housing assembly 1000 may be accomplished in a number of different ways. In one exemplary embodiment, the cover 1016 is in the form of a living hinge attached midway on side wall 1022b of the snap-fit assembly component 1018, the cover 1016 snap-fitting to the enclosure over the side opening 1012 forming a snap-fit seal. A benefit attributed to this embodiment is the ability to injection mold the inventive housing assembly 1000 as a single piece rather than molding several parts and assembling them. Mold costs are reduced, and mold life is extended since less heat is generated. In another exemplary embodiment, the cover is a separate piece that snap-fits to the enclosure over the side opening again forming a snap-fit seal. As will be readily appreciated by those skilled in the art, draft angles may be applied to parts of the inventive housing assembly 1000 to assist with releasing the parts from a mold during injection molding.

The snap-fit assembly component 1018, which projects upward from the outer surface 1024 of the enclosure 1010, and which is slightly offset (preferably, from about 3.0 to about 3.6 mm, more preferably, from about 3.2 to about 3.4 mm) from end wall 1026a of enclosure 1010, serves as a coupling means for the tang 1028. In an exemplary embodiment, as best shown in FIG. 5, clamping means 1020 comprises an arc clamping groove 1040 for adaptably clamping the tang 1028, and a clamping port 1042 enabling the tang 1028 to enter the arc clamping groove 1040, wherein the clamping port 1042 is arranged upwardly from the arc clamping groove 1040. The clamping port is provided with inclined guide blocks 1044a, 1044b, at both sides respectively for facilitating the tang 1028 to slide into the arc clamping groove 1040.

The arc clamping groove 1040 obviates the need for a plurality of ribs on an inner surface thereof, the ribs allowing for a secure fit regardless of minor variations in the size/diameter of the tang. By way of the present invention, the arc clamping groove 1040 replaces the need for the ribs, where arc clamping groove 1040 is sized such that all tangs within an expected tolerance range will "fit", the larger tangs merely flexing the arc clamping groove 1040 to a greater degree.

The two opposing side walls 1022*a*, 1022*b*, of the snap-fit assembly component 1018 serve as anti-rotation tabs once the tang 1028 of the tool has been slid into the arc clamping groove 1040. As will be readily appreciated, tang 1028 may be slid into the arc clamping groove 1040 from either end of snap-fit assembly component 1018. The tool is preferably positioned such that at least a portion of the elbow bend or fitting 1032 connecting the tang 1028 to the main body or working portion 1030 of the tool is positioned between the two-opposing side walls 1022*a*, 1022*b*, thereby further aiding in preventing the housing assembly 1000 from rotating or twisting during an injection molding process.

In the third exemplary embodiment, the "closed" housing assembly 1000 (i.e., when cover 1016 is snap-fit to the enclosure over side opening 1012) preferably measures from about 50 to about 70 mm in overall length, from about 9.6 to about 14.8 mm in overall width, and from about 14.7 to about 19.7 mm in overall height.

The substantially rectangular-shaped enclosure 1010 preferably measures from about 50 to about 70 mm in length, from about 5.4 to about 15.4 mm in width, and from about 2.9 to about 8.7 mm in height. As noted above, side opening 1012, which extends through enclosure 1010, is sized to accommodate detectable wireless tag 1014. Spaced ribs 1038, which extend across an inner surface of oppositely facing longitudinal walls 1034*a*, 1034*b*, have a preferred diameter ranging from about 0.5 to about 1.5 mm, and are positioned apart from adjacent ribs at a preferred distance of from about 3 to about 7 mm.

As noted above, cover 1016 is sized to snap-fit over side opening 1012 of substantially rectangular-shaped enclosure 1010.

The snap-fit assembly component 1018 preferably measures from about 24.7 to about 32.7 mm in overall length, from about 1.3 to about 1.7 mm in overall width, and from about 6.4 to about 16.4 mm in overall height. Opposing side walls 1022*a*, 1022*b* are spaced apart at a distance of from about 1.3 to about 1.7 mm, while arc clamping groove 1040, which is positioned between opposing side walls 1022*a*, 1022*b*, has an inner diameter that approximates the outer diameter of tang 1028.

Similar to the first and second exemplary embodiments of the subject invention, when the third exemplary embodiment is assembled onto the tang of a tool, the antenna of the wireless tag and the tang are galvanically separated and are not electromagnetically coupled. In other words, the subject invention does not provide for the electromagnetic coupling of the antenna of the wireless tag to the tang.

Article

The inventive article also serves: to hold the tag in a desired position/location for optimal range through one or more manufacturing processes (e.g., a molding or overmolding process for producing a handle); and to protect the tag from harm resulting from its exposure to raised temperatures and pressures during the one or more manufacturing processes.

The inventive article is formed on a projection or tang of a tool, the projection or tang holding a working portion of the tool, the article comprising a side opening in the form of a downwardly sloped slot that extends above and beyond the projection or tang contained within the article, the downwardly sloped slot being sized to securely anchor the tag.

By way of the present invention, it has been discovered that the tag can touch a metal projection or tang but would need to overhang or extend beyond the projection or tang to obtain stable scans once the handle molding process is complete. In a preferred embodiment, the degree of overhang (i.e., the distance d that the detectable wireless tag extends past the projection or tang below it) is preferably at least about 1.3 centimeters (cm), more preferably from about 1.3 cm to about 2.3 cm.

Referring now to FIGS. 6-11, reference numerals 1100 and 1200 have been used to denote a first and a second exemplary embodiment of the inventive article.

As best shown in FIG. 6, the first exemplary embodiment 1100 of the inventive article is shown formed onto a projection or tang 1102 of a meat hook, the hook suitable for use with a T-Handle (not shown). Article 1100 has a downwardly sloped slot 1104 that is sized to securely anchor a detectable wireless tag 1106. The slot 1104, as well as the detectable wireless tag 1106 contained therein, extend above and a distance d beyond the projection or tang 1102. Article 1100 also has a substantially three dimensional (3D) rectangular shaped lower portion 1108, and an upper portion 1110 with a downwardly sloped outer surface. A lower surface 1112 of the lower portion 1108 has a raised portion 1114. The embedded tang 1102 enters article 1100 at raised portion 1114, turns substantially 90 degrees and then extends substantially parallel to the lower surface 1112.

Article 1100 has a thickness T that is greater than or equal to the width W of tag 1106. In a preferred embodiment, article 1100 has a thickness T that is greater than the width W of tag 1106, with tag 1106 exposed on only one side of slot 1104. In another preferred embodiment, slot 1104 has one or more spaced ribs 1122*a*, 1122*b*, extending from one or both oppositely facing longitudinal walls of slot 1104, which allow for a secure fit between slot 1104 and tag 1106 regardless of minor variations in the size/shape of slot 1104.

In this exemplary embodiment, article 1100 has a length extending from a distal side wall 1116 to an opposing distal side wall 1118 ranging from about 50 to about 70 mm, preferably, from about 59 to about 62 mm, a maximum height extending from an upper surface 1120 to the lower surface 1112 ranging from about 15 to about 25 mm, preferably, from about 18 to about 22 mm, and a minimum height ranging from about 5 to about 12 mm, preferably, from about 7 to about 9 mm.

As best shown in FIG. 7, the second exemplary embodiment 1200 of the inventive article is shown formed onto a projection or tang 1202 of a boning hook, the hook suitable for use with an in-line handle (not shown). Tang 1202 differs from tang 1102 shown in FIG. 6 in terms of its degree of bend (DOB). Except for portion 1204, formed by step down side wall 1206 and angled side wall 1208, terminating at distal side wall 1210, article 1200 has the same overall shape and configuration as the first exemplary embodiment. The embedded tang 1202 enters article 1200 through distal side wall 1210, turns obtusely relative to the working portion of the tool, and then extends toward the center of the article. Downwardly sloped slot 1212, as well as detectable wireless tag 1214 contained therein, extend above and a distance d beyond the projection or tang 1202.

Similar to the first exemplary embodiment, article 1200 has a thickness T that is greater than or equal to the width W of tag 1214, and in a preferred embodiment, has a thickness T that is greater than the width W of tag 1214, with tag 1214 exposed on only one side of slot 1212. In another preferred embodiment, slot 1212 has one or more spaced ribs 1216*a*, 1216*b*, extending from one or both oppositely facing longitudinal walls of slot 1212, which allow for a secure fit between slot 1212 and tag 1214.

In this second exemplary embodiment, article 1200 has a length extending from distal side wall 1210 to an opposing distal side wall 1218 ranging from about 50 to about 70 mm, preferably, from about 59 to about 62 mm, a maximum height extending from an upper surface 1220 to a lower surface 1222 ranging from about 15 to about 25 mm, preferably, from about 18 to about 22 mm, and a minimum height ranging from about 5 to about 12 mm, preferably, from about 7 to about 9 mm.

The first and second exemplary embodiments of the inventive article may be formed onto a tang with a plastics material using, for example, an injection molding (i.e., heat/pressure molding) or other forming process. Suitable plastics materials include, but are not limited to, moldable plastics such as polyethylene, polypropylene, polystyrene, and vinyl acetate. A benefit attributed to both the first and second exemplary embodiments is the ability to form the inventive article onto a tang as a single piece.

Handle

Handles (e.g., inline and T-Handles) may be made from any suitable material including, but not limited to, plastics, metal, wood, stone, composite, synthetic, natural, and man-made materials.

In an exemplary embodiment, the tang and the housing assembly, which surrounds the tang, as well as the inventive article formed onto a tang, are overmolded with a plastics material using, for example, an injection molding (i.e., heat/pressure molding) or other forming process. Suitable plastics materials include, but are not limited to, moldable plastics such as polyethylene, polypropylene, polystyrene, and vinyl acetate. In one exemplary embodiment, the tool is a meat or meat processing hook and the moldable plastics material is a purple-colored moldable plastics material.

The first and second exemplary embodiments of the inventive housing assembly and tang overmolded with a plastics material to form a handle 40, 400, are shown in FIGS. 1C and 2C. The first exemplary embodiment 1100 of the inventive article, which is formed onto a tang of a meat hook 1124, is shown positioned on one-half of a T-Handle mold 1126 in FIG. 8, with the final product overmolded with a plastics material to form a handle 1128 shown in FIG. 10. The second exemplary embodiment 1200 of the inventive article, which is formed onto a tang of a boning hook 1224, is shown positioned on one-half of an in-line handle mold 1226 in FIG. 9, with the final product overmolded with a plastics material to form a handle 1228 shown in FIG. 11.

Upon completion of the molding process, and upon cooling of the overmolded assembly or article to ambient temperature, Acceptance Quality Limits (AQL) testing (scan performance) is performed. The testing involves signaling the passive RFID tag (which is now embedded inside either the housing assembly or the article and the handle) and receiving an expected acknowledging signal from the RFID tag using an RFID omnidirectional scanner within a desired range of at least about 15 cm, preferably, from about 15 to about 200 cm.

In another exemplary embodiment, a handle is molded onto the housing assembly separate from the tang (e.g., injection molded) and upon cooling is attached to the tang using, for example, known hafting techniques. In one such exemplary embodiment, the inventive housing assembly is pressed, by hand, onto a tang-shaped tongue (i.e., a steel molding fixture). The tongue is held in place during the handle molding process, and then removed immediately, while hot, leaving the housing assembly and a tang-shaped hole in the handle. When hafted, the tang is slid into the hole and through the housing assembly.

Alternatively, the handle may be prepared with an elongated hollow hole at its center. The tang and housing assembly or the tang and article are inserted into the hollow hole and an injection molded plastic material is used to cover, surround, and hold the handle to both the tang and either the housing assembly or the article.

Method for Providing a Tool with a Detectable Wireless Tag

The present invention further provides a method for providing a tool with a detectable wireless tag, which uses the inventive housing assembly, and which comprises:

(a) arranging for a detectable wireless tag to be housed within an assembly; and either (b)(1) arranging for the assembly housing the detectable wireless tag to be positioned on the projection or tang of the tool, and then arranging for either (i) a handle to be formed over and thereby encompass the assembly and the tang, or (ii) the tang with the assembly to be inserted into a hole in a pre-existing handle and then at least partially filling the hole to firmly hold in place the assembly and the tang; or (b)(2) arranging for a handle to be formed over and thereby encompass the assembly housing the detectable wireless tag and attaching the tang to the handle and assembly using known techniques (e.g. hafting technique).

In an exemplary embodiment, the inventive method comprises:

1. moving the inner holder 14, 140 onto the projection or tang 26, 260 and tapping it into place using, for example, a rubber mallet;

2. adhering the detectable wireless tag 18, 180 onto the inner holder 14, 140 so that the tag electronics are positioned over the substantially flat section 20, 200, the tag antenna extending on either side of the substantially flat section;

3. moving and engaging (e.g., snap-fitting) the outer holder 16, 160 onto the inner holder 14, 140; and then 4. either arranging for a handle to be formed over and thereby encompass the housing assembly 10, 100 and the tang 26, 260, or arranging for the housing assembly 10, 100 and the tang 26, 260 to be inserted into a hole in a pre-existing handle and then bonded in place by at least partially filling the hole with, for example, a melt flowing adhesive.

In another exemplary embodiment, the inventive method comprises:

1. adhering the detectable wireless tag 18, 180 onto the inner holder 14, 140 so that the tag electronics are positioned over the substantially flat section 20, 200, the tag antenna extending on either side of the substantially flat section;

2. moving and engaging (e.g., snap-fitting) the outer holder 16, 160 onto the inner holder 14, 140 for form an assembly;

3. arranging for a handle to be formed over and thereby encompass the assembly; and 4. attaching the tang to the handle and assembly using, for example, a hafting technique.

In a further exemplary embodiment, the inventive method comprises:

1. depositing the detectable wireless tag 1014 into the side opening 1012 of the substantially rectangular-shaped enclosure 1010 of housing assembly 1000;

2. moving and positioning the cover 1016 over the side opening 1012 of the substantially rectangular-shaped enclosure 1010, and engaging (e.g., snap-fitting) the cover 1016 onto the side opening 1012;

3. arranging for the tang 1028 to be inserted into the arc clamping groove 1040 through the clamping port 1042 preferably so that the elbow bend or fitting 1032 is positioned between opposing side walls 1022*a*, 1022*b*; and then 4. either arranging for a handle to be formed over and thereby encompass the housing assembly 1000 and the tang 1028 and preferably also the elbow bend or fitting 1032, or arranging for the housing assembly 1000 and the tang 1028 to be inserted into a hole in a pre-existing handle and then bonded in place by at least partially filling the hole with, for example, a melt flowing adhesive.

The present invention also provides a method for providing a tool with a detectable wireless tag, which uses the inventive article, and which comprises:

forming the article on the projection or tang of the tool, wherein the article has a side-opening in the form of a downwardly sloped slot that extends above and beyond the projection or tang contained therein, the downwardly sloped slot sized to securely anchor the detectable wireless tag;

inserting the detectable wireless tag into the downwardly sloped slot of the article; and either forming a handle onto the article and the tang, the handle fully encompassing the article and the tang; or arranging for the article and the tang to be inserted into a hole in a pre-existing handle and then at least partially filling the hole to firmly hold in place the article and the tang.

In an exemplary embodiment, the inventive method is a dual-molding method, which comprises:

molding an article onto the projection or tang of the tool, wherein the article has a side-opening in the form of a downwardly sloped slot that extends above and beyond the projection or tang contained within the article, the downwardly sloped slot sized to securely anchor the detectable wireless tag;

inserting the detectable wireless tag into the downwardly sloped slot of the molded article; and overmolding a handle onto the molded article and tang, the handle fully encompassing the molded article and the tang.

Method for Monitoring (Tracking and Tracing) Tools Used within a Packaging Facility The present invention also provides a method for monitoring (tracking and tracing) tools used within a packaging facility (e.g., a meat, poultry or fish packaging facility), which method comprises: using either the inventive housing assembly or the inventive article with tools used within the packaging facility to track and trace each tool within the facility. By use of the inventive monitoring method, each tool's real-time location may be determined and the maintenance of cleanliness and sanitation standards for each tool ensured. The inventive method may also be used to determine the real-time condition of each tool and to use this information to manage the training/competency of the users, with a goal toward reducing repetitive motion injuries.

Although exemplary embodiments have been shown and described, it will be clear to those of ordinary skill in the art that a number of changes, modifications, or alterations to the invention as described can be made. All such changes, modifications, and alternations should therefore be seen as within the scope of the disclosure.

We claim:

1. An article for holding a detectable wireless tag, which is formed onto a tang of a tool, the tang holding a working portion of the tool, the article comprising a side opening in the form of a downwardly sloped slot that extends above and beyond the tang contained within the article, the downwardly sloped slot being sized to securely anchor the tag.

2. The article of claim 1, wherein the detectable wireless tag is selected from the group of radio frequency identification (RFID) tags, ultra-wide-band location (UWB) tags, WiFi location tags and infrared (IR) location tags.

3. The article of claim 2, wherein the detectable wireless tag is an RFID tag.

4. The article of claim 3, wherein the RFID tag is a passive ultra-high frequency RFID tag.

5. The article of claim 1, wherein the downwardly sloped slot laterally extends at least about 1.3 centimeters beyond the tang.

6. The article of claim 5, wherein the downwardly sloped slot laterally extends from about 1.3 centimeters to about 2.3 centimeters beyond the tang.

7. The article of claim 1, wherein the article is a molded article.

8. An article for holding a detectable wireless tag, which is formed onto a projection or tang of a tool, the projection or tang holding a working portion of the tool, the article comprising a side opening in the form of a downwardly sloped slot that extends above and beyond the projection or tang contained within the article, the downwardly sloped slot being sized to securely anchor the tag, wherein the tool is used with an in-line handle, the tang entering the article through a distal end thereof, turning at an obtuse angle relative to the working portion of the tool, and then extending toward a center of the article.

9. An article for holding a detectable wireless tag, which is formed onto a projection or tang of a tool, the projection or tang holding a working portion of the tool, the article comprising a side opening in the form of a downwardly sloped slot that extends above and beyond the projection or tang contained within the article, the downwardly sloped slot being sized to securely anchor the tag, wherein the tool is used with a T-Handle, the tang entering the article through a lower surface thereof, turning at a 90-degree angle relative to the working portion of the tool, and then extending substantially parallel to a lower surface of the article.

10. A tool having a detectable wireless tag, wherein the tool comprises: a working portion with a tang by which the working portion of the tool is held; an article formed onto the tang of the tool, the article including a side opening in the form of a downwardly sloped slot that extends above and beyond the tang contained within the article, wherein the tag is located within the downwardly sloped slot, which is sized to securely anchor the tag; and a handle disposed over and encompassing the article and the tang.

11. The tool of claim 10, wherein the downwardly sloped slot laterally extends at least about 1.3 centimeters beyond the tang.

12. The tool of claim 11, wherein the downwardly sloped slot laterally extends from about 1.3 centimeters to about 2.3 centimeters beyond the tang.

13. The tool of claim 10, wherein the wireless tag has a wide omnidirectional read range when held within the article and embedded within the handle of at least about 15 centimeters.

14. The tool of claim 10, wherein the handle is made using a purple-colored material.

15. The tool of claim 10, wherein the article is a molded article.

16. A tool having a detectable wireless tag, wherein the tool comprises: a working portion with a projection or tang by which the working portion of the tool is held; an article formed onto the projection or tang of the tool, the article including a side opening in the form of a downwardly sloped slot that extends above and beyond the projection or tang contained within the article, wherein the tag is located within the downwardly sloped slot, which is sized to securely anchor the tag; and a handle disposed over and encompassing the article and the tang, wherein the tool is used with an in-line handle, the tang entering the article through a distal end thereof, turning at an obtuse angle relative to the working portion of the tool, and then extending toward a center of the article.

17. A tool having a detectable wireless tag, wherein the tool comprises: a working portion with a projection or tang by which the working portion of the tool is held; an article formed onto the projection or tang of the tool, the article including a side opening in the form of a downwardly sloped slot that extends above and beyond the projection or tang contained within the article, wherein the tag is located within the downwardly sloped slot, which is sized to securely anchor the tag; and a handle disposed over and encompassing the article and the tang, wherein the tool is used with a T-Handle, the tang entering the article through a lower surface thereof, turning at a 90 degree angle relative to the working portion of the tool, and then extending substantially parallel to a lower surface of the article.

18. A method for providing a tool with a detectable wireless tag and a handle, the tool including a working portion with a tang by which the working portion of the tool is held, the method comprising:

forming the article on the tang of the tool, wherein the article has a side-opening in the form of a downwardly sloped slot that extends above and beyond the tang contained within the article, the downwardly sloped slot sized to securely anchor the detectable wireless tag;

inserting the detectable wireless tag into the downwardly sloped slot of the article; and either forming a handle onto the article and the tang, the handle fully encompassing the article and the tang; or arranging for the article and the tang to be inserted into a hole in a pre-existing handle and then at least partially filling the hole to firmly hold in place the article and the tang.

19. The method of claim 18, wherein the downwardly sloped slot laterally extends at least about 1.3 centimeters beyond the tang.

20. The method of claim 19, wherein the downwardly sloped slot laterally extends from about 1.3 centimeters to about 2.3 centimeters beyond the tang.

21. The method of claim 18, wherein the tool is selected from the group of knives, meat cleavers, honing steels, meat or meat processing hooks, manual meat and bone saws, and meat tenderizers, and the handle is formed using a purple-colored material.

22. The method of claim 21, wherein the tool is a meat or meat processing hook, and the handle is formed using a purple-colored material.

23. A method for providing a tool with a detectable wireless tag and a handle, the tool including a working portion with a projection or tang by which the working portion of the tool is held, the method comprising:

forming the article on the projection or tang of the tool, wherein the article has a side-opening in the form of a downwardly sloped slot that extends above and beyond the projection or tang contained within the article, the downwardly sloped slot sized to securely anchor the detectable wireless tag;

inserting the detectable wireless tag into the downwardly sloped slot of the article; and either forming a handle onto the article and the tang, the handle fully encompassing the article and the tang; or arranging for the article and the tang to be inserted into a hole in a pre-existing handle and then at least partially filling the hole to firmly hold in place the article and the tang, wherein the method is dual-molding method which comprises:

molding an article onto the projection or tang of the tool, wherein the article has a side-opening in the form of a downwardly sloped slot that extends above and beyond the projection or tang contained within the article, the downwardly sloped slot sized to securely anchor the detectable wireless tag;

inserting the detectable wireless tag into the downwardly sloped slot of the molded article; and overmolding a handle onto the molded article and tang, the handle fully encompassing the molded article and the tang.

24. The method of claim 23, wherein the downwardly sloped slot laterally extends at least about 1.3 centimeters beyond the projection or tang.

25. The method of claim 24, wherein the downwardly sloped slot laterally extends from about 1.3 centimeters to about 2.3 centimeters beyond the projection or tang.

26. A method for tracking and tracing tools used within a packaging facility, which method comprises using an article for holding a detectable wireless tag with tools used within the packaging facility to track and trace each tool within the facility, wherein the article is formed onto a projection or tang of a tool, the projection or tang holding a working portion of the tool, the article comprising a side opening in the form of a downwardly sloped slot that extends above and beyond the projection or tang contained within the article, the downwardly sloped slot being sized to securely anchor the tag.

27. The method of claim 26, wherein the tool comprises: a working portion with a tang by which the working portion of the tool is held; the detectable wireless tag located within the downwardly sloped slot of the article; and a handle disposed over and encompassing the article and the tang, wherein the detectable wireless tag, which has its own antenna, operates independently of the tang.

28. The method of claim 27, wherein the tool is a meat hook, and the handle is made using a purple-colored material.

29. The method of claim 27, wherein the tool is a boning hook, and the handle is formed using a purple-colored material.

30. The method of claim 27, wherein the detectable wireless tag is an RFID tag.

\* \* \* \* \*